(12) United States Patent
Uejima

(10) Patent No.: US 10,194,059 B2
(45) Date of Patent: Jan. 29, 2019

(54) IMAGE PROCESSING APPARATUS AND IMAGE PROCESSING METHOD

(71) Applicant: Hitachi Information & Telecommunication Engineering, Ltd., Yokohama-shi, Kanagawa (JP)

(72) Inventor: Toshiaki Uejima, Kanagawa (JP)

(73) Assignee: Hitach Information & Telecommunication Engineering, Ltd., Yokohama-shi (JP)

( * ) Notice: Subject to any disclaimer, the term of this patent is extended or adjusted under 35 U.S.C. 154(b) by 0 days.

(21) Appl. No.: 15/504,995

(22) PCT Filed: Sep. 25, 2015

(86) PCT No.: PCT/JP2015/077157
§ 371 (c)(1),
(2) Date: Feb. 17, 2017

(87) PCT Pub. No.: WO2017/051480
PCT Pub. Date: Mar. 30, 2017

(65) Prior Publication Data
US 2017/0280026 A1  Sep. 28, 2017

(51) Int. Cl.
*H04N 5/14* (2006.01)
*G06T 7/285* (2017.01)
(Continued)

(52) U.S. Cl.
CPC .......... *H04N 5/145* (2013.01); *G01S 13/931* (2013.01); *G06K 9/00805* (2013.01); *G06T 7/00* (2013.01);
(Continued)

(58) Field of Classification Search
None
See application file for complete search history.

(56) References Cited

U.S. PATENT DOCUMENTS

2008/0063236 A1* 3/2008 Ikenoue .................. G06K 9/32
382/103
2015/0294143 A1* 10/2015 Wells ................. G06K 9/00369
348/159

FOREIGN PATENT DOCUMENTS

JP  2002-269570 A  9/2002
JP  2005-44352 A  2/2005
(Continued)

OTHER PUBLICATIONS

Japanese-language International Search Report (PCT/ISA/210) issued in PCT Application No. PCT/JP2015/077157 dated Oct. 20, 2015 (Three (3) pages).
(Continued)

Primary Examiner — Matthew Bella
Assistant Examiner — Brian Shin
(74) Attorney, Agent, or Firm — Crowell & Moring LLP

(57) ABSTRACT

The position of a next object is estimated efficiently according to the observed value of physical quantity related to the object in an actual environment. An image processing apparatus extracts a first object image of state prediction from a first image and identifies the type of the first object. A model appropriate to the type of the object of state prediction is merged with the first object image and a feature point of the first object image is associated with the model. A plurality of motion sequences are selected from a finite state sequence corresponding to the type of the first object according to the position of the first object and the initial observed state.

13 Claims, 10 Drawing Sheets

(51) Int. Cl.
| | |
|---|---|
| G06T 7/277 | (2017.01) |
| G06T 7/215 | (2017.01) |
| G06T 7/246 | (2017.01) |
| G06K 9/00 | (2006.01) |
| G06T 7/00 | (2017.01) |
| G06T 7/20 | (2017.01) |
| G01S 13/93 | (2006.01) |
| H04N 5/232 | (2006.01) |

(52) U.S. Cl.
CPC ............... G06T 7/20 (2013.01); G06T 7/215 (2017.01); G06T 7/246 (2017.01); G06T 7/277 (2017.01); G06T 7/285 (2017.01); H04N 5/23254 (2013.01); *G06T 2207/10021* (2013.01); *G06T 2207/30252* (2013.01)

(56) References Cited

FOREIGN PATENT DOCUMENTS

| | | |
|---|---|---|
| JP | 2007-299312 A | 11/2007 |
| JP | 2011-90465 A | 5/2011 |
| JP | 2014-63273 A | 4/2014 |

OTHER PUBLICATIONS

Japanese-language Written Opinion (PCT/ISA/237) issued in PCT Application No. PCT/JP2015/077157 dated Oct. 20, 2015 (Five (5) pages).

Extended European Search Report issued in counterpart European Application No. 15904737.2 dated Jun. 18, 2018 (eight (8) pages).

Du, W. et al., "Tracking by Cluster Analysis of Feature Points and Multiple Particle Filters", Pattern Recognition and Image Analysis Lecture Notes in Computer Science, University of Liège, Department of Electrical Engineering and Computer Science, Jan. 1, 2015, pp. 701-710. Berlin, Germany, XP019018590.

Goyat, Y. et al., "Tracking of Vehicle Trajectory by Combining a Camera and a Laser Rangefinder", Machine Vision and Applications, Mar. 26, 2009, pp. 275-286, vol. 21, No. 3, Berlin, Germany, XP019797436.

Yang, J. et al., "Feature Fusion for Vehicle Detection and Tracking with Low-Angle Cameras", Applications of Computer Vision (WACV), Jan. 5, 2011, pp. 382-388, XP031913599.

* cited by examiner

FIG. 7A

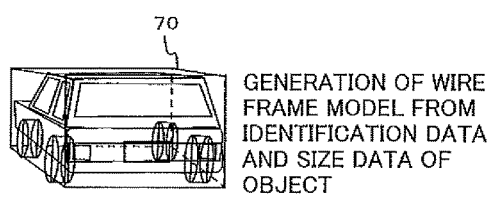

GENERATION OF WIRE FRAME MODEL FROM IDENTIFICATION DATA AND SIZE DATA OF OBJECT

FIG. 7B

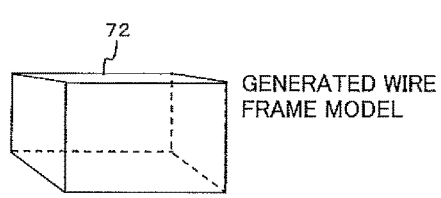

GENERATED WIRE FRAME MODEL

FIG. 9A

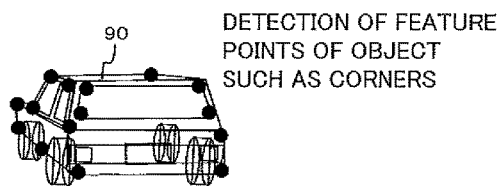

DETECTION OF FEATURE POINTS OF OBJECT SUCH AS CORNERS

FIG. 9B

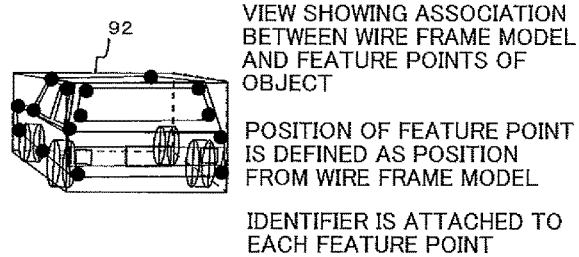

VIEW SHOWING ASSOCIATION BETWEEN WIRE FRAME MODEL AND FEATURE POINTS OF OBJECT

POSITION OF FEATURE POINT IS DEFINED AS POSITION FROM WIRE FRAME MODEL

IDENTIFIER IS ATTACHED TO EACH FEATURE POINT

FIG. 10

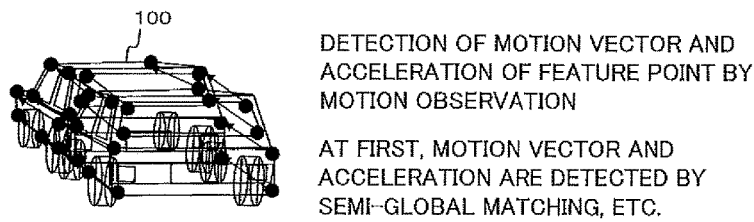

DETECTION OF MOTION VECTOR AND ACCELERATION OF FEATURE POINT BY MOTION OBSERVATION

AT FIRST, MOTION VECTOR AND ACCELERATION ARE DETECTED BY SEMI-GLOBAL MATCHING, ETC.

SINGLE MOTION ANGLE IS SHOWN WIDELY BY CONCEPTUAL DESCRIPTION.

MOTION SEQUENCE SELECTION BASED ON STATE OF OBJECT IS SHOWN CONCEPTUALLY.

FIG. 18

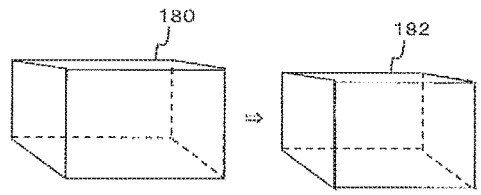

DEFORMATION BY PROJECTION TRANSFORMATION OF WIRE FRAME MODEL

A PLURALITY OF WIRE FRAME MODELS DEFORMED ACCORDING TO A PLURALITY OF TWO-DIMENSIONAL MOTION PREDICTIONS ARE ALSO GENERATED.

FIG. 19

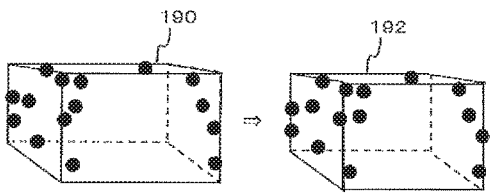

PROJECTION TRANSFORMATION OF FEATURE POINTS ASSOCIATED WITH WIRE FRAME MODEL

TRANSFORMATION OF FEATURE POINTS

A PLURALITY OF FEATURE POINT SETS ARE GENERATED FOR A PLURALITY OF GENERATED WIRE FRAME MODELS DEFORMED ACCORDING TO A PLURALITY OF TWO-DIMENSIONAL MOTION PREDICTIONS.

FIG. 20

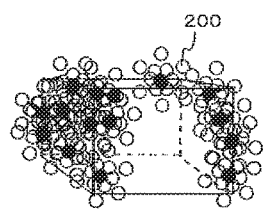

PARTICLES ARE GENERATED IN A SMALL AREA OF CORRESPONDING FEATURE POINT ACCORDING TO PROBABILITY.

IN GENERATING PARTICLES, HORIZONTAL AND VERTICAL DISPLACEMENT AND PROBABILITY DISPLACEMENT ARE SHIFTED IN THE SAME GROUP SO THAT PARTICLES COVER EACH OTHER TO ENHANCE SPATIAL COMPREHENSIVENESS WITH A SMALL NUMBER OF PARTICLES.

FIG. 21

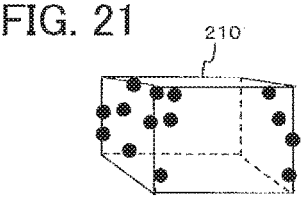

AFTER MATCHING IN DESCENDING ORDER OF PROBABILITY, MATCHING OF FEATURE POINTS CORRESPONDING TO THE GEOMETRY CONCERNED IS DONE.

IMAGE PROCESSING APPARATUS AND IMAGE PROCESSING METHOD

TECHNICAL FIELD

The present invention relates to an image processing apparatus and an image processing method, and more particularly to technology which predicts change in the state of an object from a captured image.

BACKGROUND ART

Patent Literature 1 proposes a technique which estimates the physical quantity of an object from a captured image by a particle filter method and estimates the position of an object by a condensation method by taking a quantity related to the feature quantity of the object as a weight.

Patent Literature 2 proposes a technique in which a three-dimensional model comprised of a plurality of feature points with three-dimensional coordinate values and partial image data representing a partial image related to each feature point is projected into a two-dimensional observation space, the state quantity of the three-dimensional model is estimated using a feature point set selected in the two-dimensional observation space, the estimated three-dimensional model state is projected into the observation space and the adaptability is repeatedly calculated to estimate the state quantity of the three-dimensional model.

In Patent Literature 3, an area of interest for determining the presence of a target is sequentially set in a plurality of positions in an image, a reference position of a part is set according to a deformable part model (spring model) when it is assumed that a target is present in the area of interest, and a deformation cost as a value representing the degree of deviation from the reference position is calculated for each of detected parts. Then a technique is proposed in which, on the condition that a plurality of parts in the same kind whose calculated deformation costs are within a prescribed range are present, the area of interest is decided to be a target area where a target constituting a group is present.

CITATION LIST

Patent Literature

Patent Literature 1: Japanese Patent Application Laid-Open No. 2005-44352
Patent Literature 2: Japanese Patent Application Laid-Open No. 2007-299312
Patent Literature 3: Japanese Patent Application Laid-Open No. 2014-63273

SUMMARY OF INVENTION

Technical Problem

However, the tracking method based on application of a particle filter in Patent Literature 1 has a problem that if a plurality of similar objects are present and they cross each other, an error occurs in tracking of individual objects due to confusion of particles. It also has a problem that if an object is shielded, particles disappear, resulting in an object tracking error. Furthermore, it has a problem that if change in the motion of an object is not uniform, in order to achieve stable tracking, many samples must be generated and thus the processing speed decreases. Furthermore, it has a problem that as the number of objects increases, the number of samples to be generated increases and thus the processing speed decreases.

In Patent Literature 2, the state quantity of a three-dimensional model is estimated by an effective feature point set selected in the two-dimensional observation space and prediction of the current three-dimensional model state from the previous three-dimensional model state is made only by position prediction through calculation of position, speed, and acceleration, so it has a problem that in order to track complicated motion with varying acceleration, the observation interval must be shortened and thus there is not enough time to perform another processing task during observation.

The image processing device in Patent Literature 3, which uses a deformable part model, shows a method of detecting the area of a target group accurately, but it has a problem that when a plurality of similar targets move away from each other, tracking efficiency is not good.

An object of the present invention is to provide a technique which solves the above problems and predicts the position of an object at a next clock time efficiently according to the observed value of physical quantity related to the object in an actual environment.

Solution to Problem

In order to solve the above problems, the present invention is characterized by including: an image reading section which reads a first image taken at a first clock time and a second image taken at a second clock time later than the first clock time; an object identifying section which extracts a first object image as an image of a first object of state prediction from the first image, identifies the type of the first object and extracts a second object image as an image of a second object of state prediction from the second image; a model information storing section which stores model information for defining a model appropriate to the type of object of state prediction; a finite state sequence storing section which stores finite state sequences defining a plurality of state change sequences with time which correspond to the type of the first object; a model state prediction section which reads model information corresponding to the type of the first object from the model information storing section, associates a feature point of the first object image with the read model, searches a finite state sequence corresponding to the type of the first object from the finite state sequence storing section, selects a plurality of motion sequences from among motion sequences included in the searched finite state sequence according to at least one of the position of the first object and an initial observation condition of the first object, transforms a model merged with the first object image and coordinates of a feature point associated with it according to each motion sequence included in the plural selected motion sequences, and generates particles around the feature point after transformation depending on existence probability; and a matching section which performs matching between the second object image included in the second image taken at the second clock time later than the first clock time and the particles generated on the basis of the feature points and determines particles with the highest probability among the particles generated for the feature points, as a predicted state of the first object at the second clock time.

ADVANTAGEOUS EFFECTS OF INVENTION

The above invention provides a technique which estimates the position of an object at a next clock time efficiently according to the observed value of physical quantity related to the object in an actual environment. The other problems and solutions will be apparent from the following embodiment.

BRIEF DESCRIPTION OF DRAWINGS

FIGS. 7A and 7B are views which show an example of a wire frame model, in which FIG. 7A shows a wire frame model present in an observation space and FIG.7B shows only a generated wire frame model.

FIGS. 9A and 9B are views which show an example of extraction of feature points from the object image, in which FIG. 9A shows detection of feature points such as corners from an object image and FIG. 9B shows a state in which the detected feature points are associated with a wire frame model.

FIG. 10 is a view which shows an example of calculation of motion vectors and accelerations.

FIGS. 12A and 12B are views which show an example of a finite state sequence, in which FIG. 12A shows an example of a finite state sequence indicating a single motion angle widely and FIG. 12B conceptually shows selection of a motion sequence based on the state of an object.

FIG. 18 is a view which shows an example of deformation by projection transformation of a wire frame model.

FIG. 19 is a view which shows projection transformation of feature points associated with a wire frame model.

FIG. 20 is a view which shows a state in which particles are generated around corresponding feature points.

FIG. 21 is a view which shows a state in which most similar particles are selected.

DESCRIPTION OF EMBODIMENTS

Next, a preferred embodiment of the present invention will be described in detail referring to drawings.

Figure 1:
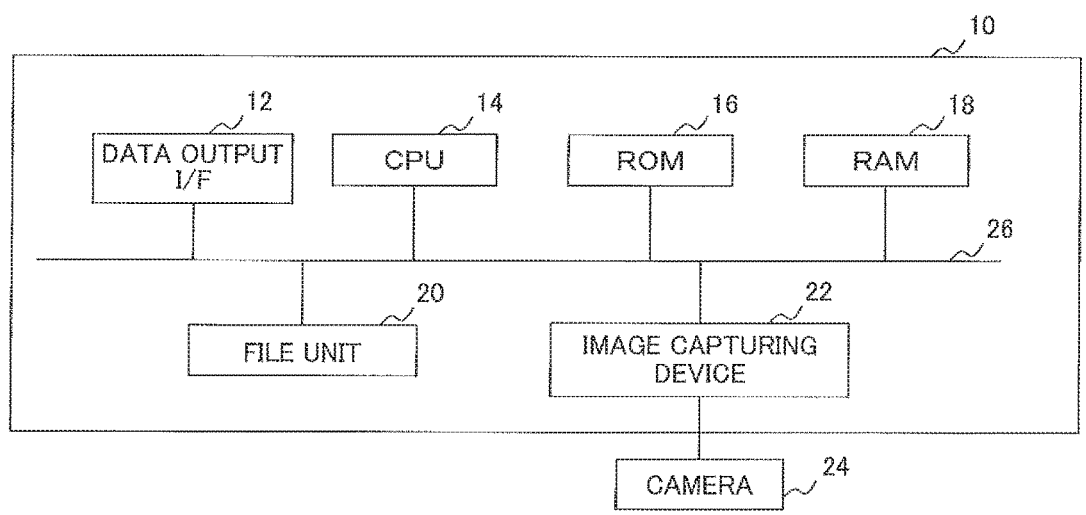
FIG. 1 is a view which shows the hardware configuration of an image processing apparatus according to an embodiment of the present invention.

FIG. 1 shows the hardware configuration of an image processing apparatus according to the embodiment of the present invention. As shown in FIG. 1, the image processing apparatus 10 according to the embodiment is configured as a computer in which a CPU 14 responsible for arithmetic processing to predict change in the state of an object, and a ROM 16 and a RAM 18 as data storage units are connected so that they can each receive and send a command and data through a bus 26. The bus 26 is connected with an image capturing device 22 which receives an image from a camera 24.

Figure 2:
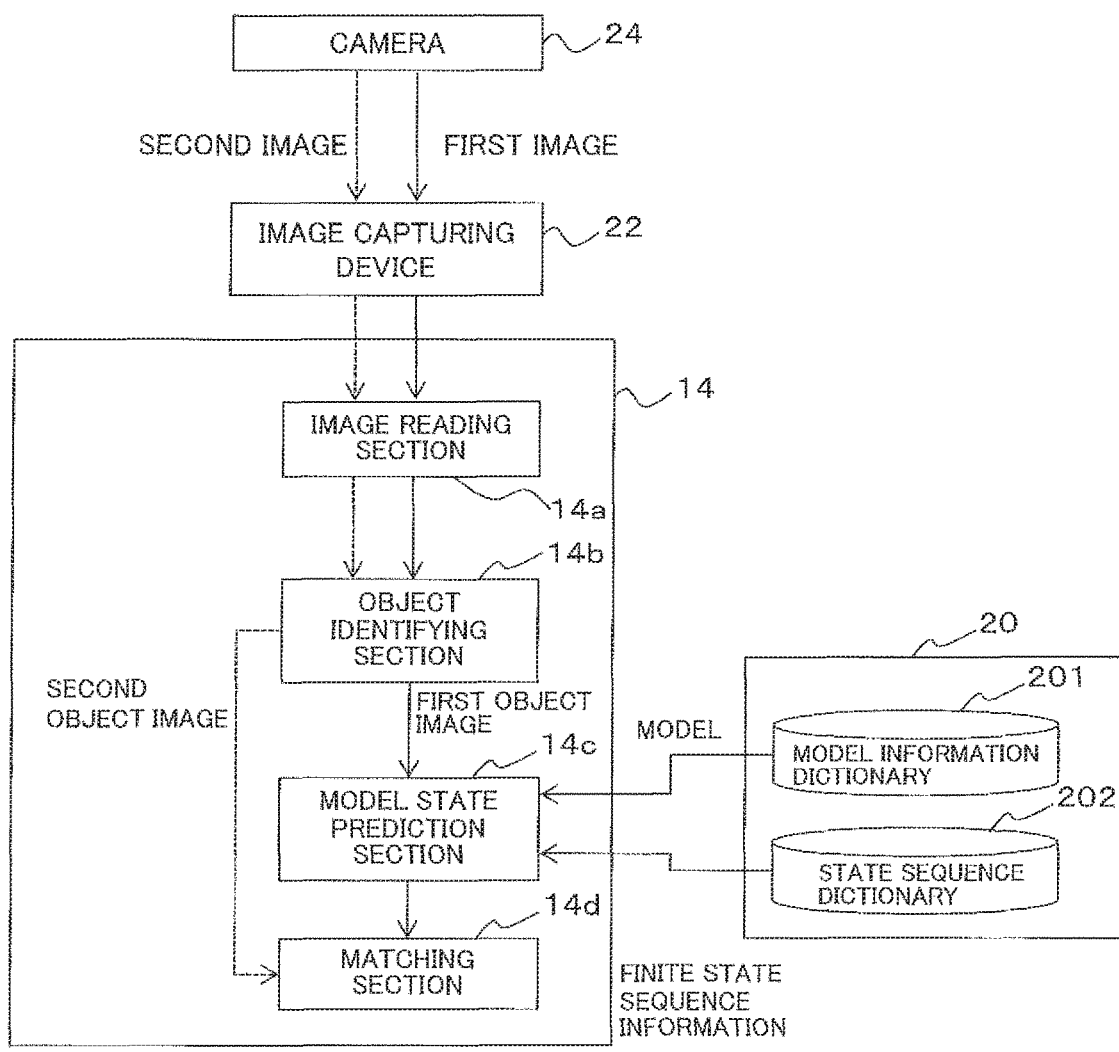
FIG. 2 is a functional block diagram which shows the structure of a state change prediction program to be executed by the image processing apparatus 10.

The bus 26 is also connected with a data output I/F 12 for outputting various data to an external device and a file unit 20 which previously stores a model information dictionary 201 for defining a model appropriate to the type of an object of state prediction (see FIG. 2) and a state sequence dictionary 202 for defining a plurality of state change sequences of a model with time (see FIG. 2). The model information dictionary 201 is equivalent to a model information memory and the state sequence dictionary 202 is equivalent to a finite state sequence memory.

ROM 16 previously stores programs such as processing routines. In addition to the above constituent elements, the image processing apparatus 10 according to this embodiment includes a power supply unit and many electric constituent elements, but since these elements are known or ordinary elements, detailed description of them is omitted.

FIG. 2 is a functional block diagram which shows the structure of a state change prediction program to be executed by the image processing apparatus 10.

The image processing apparatus 10 includes: an image reading section 14a which reads a first image taken at a first clock time by a camera 24 through the image capturing device 22 and a second image taken at a second clock time later than the first clock time; an object identifying section 14b which extracts a first object image as an image of a first object of state prediction from the first image, identifies the type of the first object and extracts a second object image as an image of a second object of state prediction from the second image; a model state prediction section 14c which selects a model appropriate to the type of the first object from the model information dictionary, associates the model with a feature point of the first object, transforms the model and the feature point according to a finite state sequence and generates particles around the feature points after transformation; and a matching section 14d which selects particles most similar to the second object image from the particles. The image reading section 14a, object identifying section 14b, model state prediction section 14c, and matching section 14d are implemented when the CPU 14 loads a program to perform the functions of the constituent elements, on the RAM 18 and executes it.

The model information dictionary 201 and state sequence dictionary 202 are structured as data stored in the file unit 20 as mentioned above.

Next, in this embodiment, an explanation will be given of a case that the image processing apparatus 10 according to the present invention is mounted in a vehicle and monitoring in the vehicle traveling direction is performed. The camera 24 is mounted in the vehicle so as to take images of other vehicles, pedestrians and the like as objects outside the vehicle.

Figure 3:
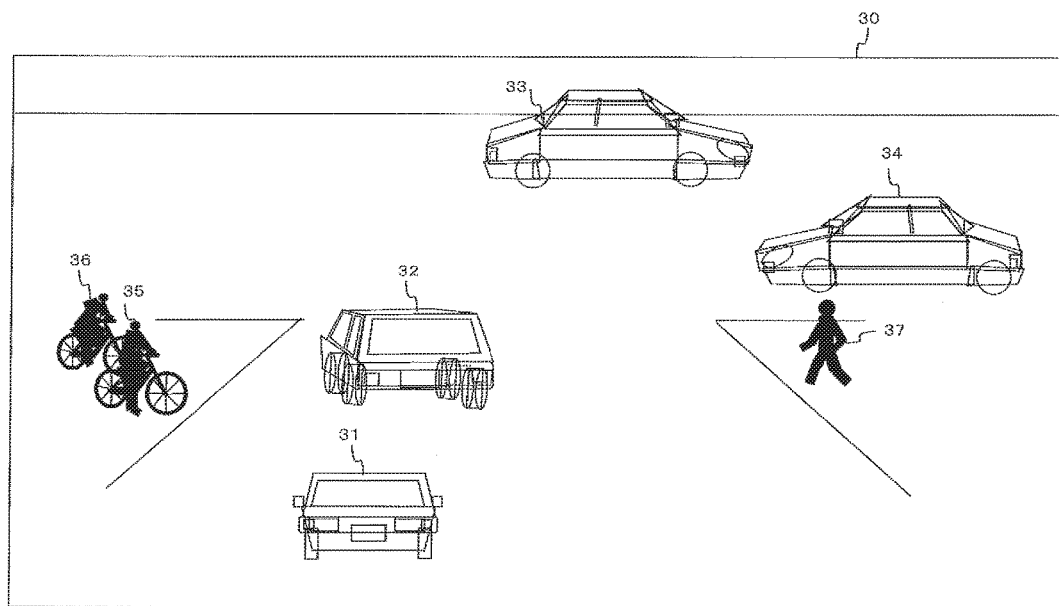
FIG. 3 is a view which explains a real space in the first embodiment.

FIG. 3 is a view which explains a real space in the first embodiment. As shown in FIG. 3, in the embodiment, a vehicle 31 in which the camera 24 is mounted is present in the real space 30. In addition, objects 32 to 37 are present in the real space 30 and monitored by the camera 24. The positions and directions of the objects 32 to 37 change. The real space 30 is, for example, a three-dimensional space in which an X axis, a Y axis, and a Z axis as coordinate axes are orthogonal to each other, and a three-dimensional point in this three-dimensional space is expressed by three-dimensional coordinates (X, Y, Z) and component velocities (and accelerations), etc.

Figure 4:
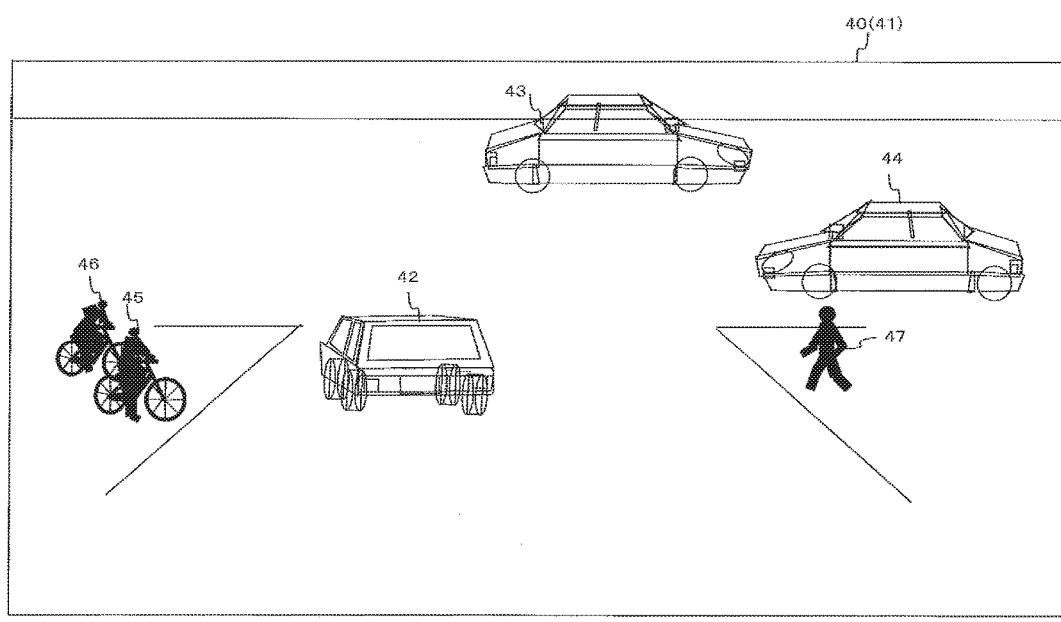
FIG. 4 is a view which shows an image (observation space) taken by a camera 24.

FIG. 4 is a view which shows an image (observation space) taken by the camera 24. In this embodiment, the inside of the image 40 is taken as an observation space 41. Specifically, the observation space 41 is a two-dimensional space in which an X axis and a Y axis as coordinate axes are orthogonal to each other and a two-dimensional point in this two-dimensional space is expressed by two-dimensional coordinates $(x_i, y_i)$. Inside the image 40, the objects 32 to 37 in the real space are imaged as areas 42 to 47 respectively. The areas 42 to 47 as images of the objects are called object images.

Figure 5:
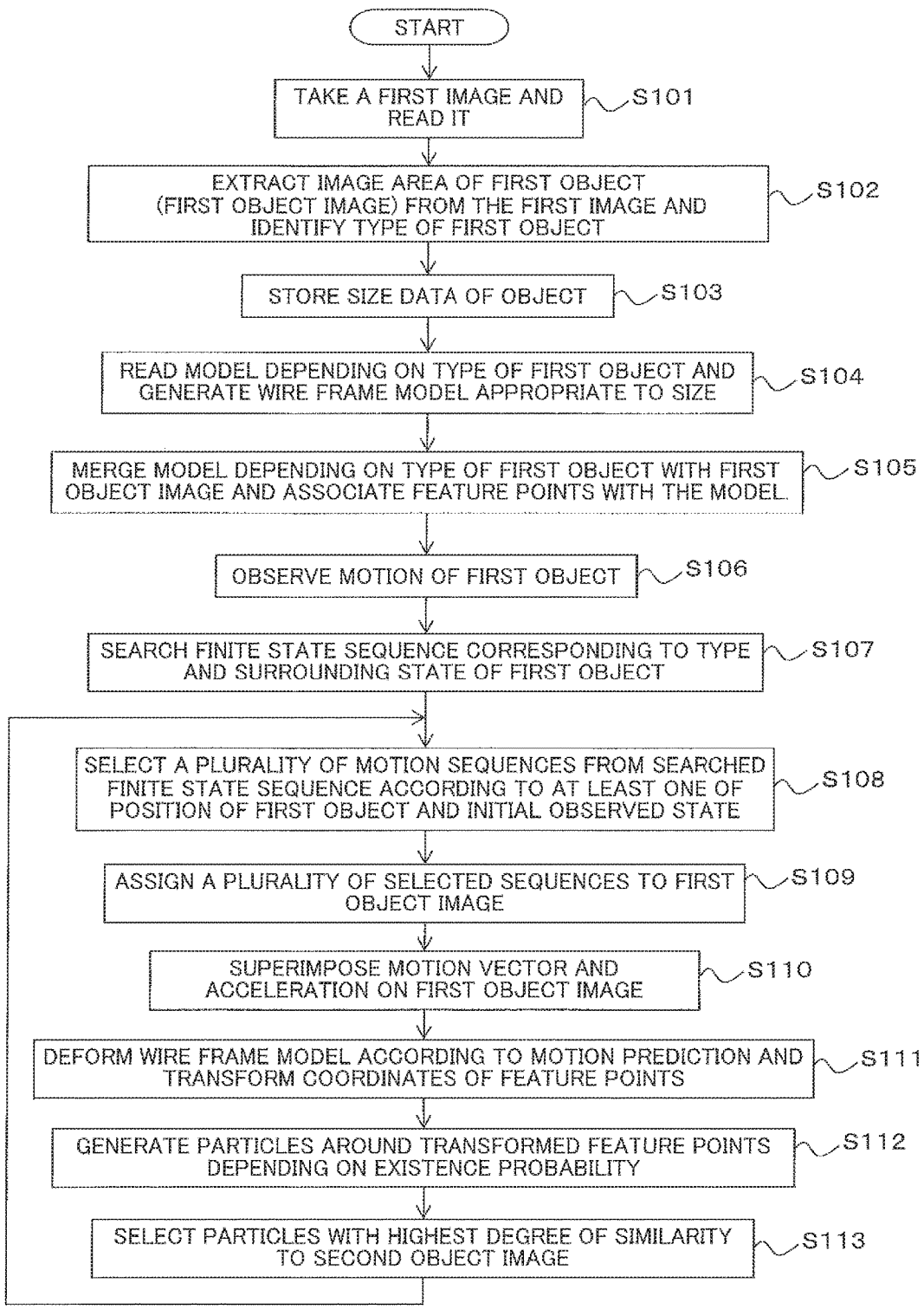
FIG. 5 is a flowchart which shows a flow of processing steps taken by the image processing apparatus according to this embodiment.

Next, an explanation will be given of the process of predicting motion of an object which is carried out by the image processing apparatus 10 in this embodiment. FIG. 5 is a flowchart which shows a flow of processing steps taken by the image processing apparatus according to this embodiment.

The image reading section 14*a* reads the first image taken by the camera 24 at the first clock time (S101) and outputs it to the object identifying section 14*b*.

The object identifying section 14*b* detects and identifies a feature of a vehicle, human being or two-wheeled vehicle from the first image by a known method (S102) and stores the result of identification as identification data on the identified object in the RAM 18. Detection of the feature of an object can be performed, for example, by the CPU 14 calculating a HOG feature quantity from a captured image, and identification of the object can be performed by the CPU 14 performing arithmetic processing with respect to the degree of similarity to the feature quantity calculated from an identification dictionary previously stored in the ROM 16 or file unit 20, using a support vector machine or boosting which is previously stored in the ROM 16 or file unit 20. At this time, an identifier corresponding to the identified object and the identification data may be attached.

Figure 6:
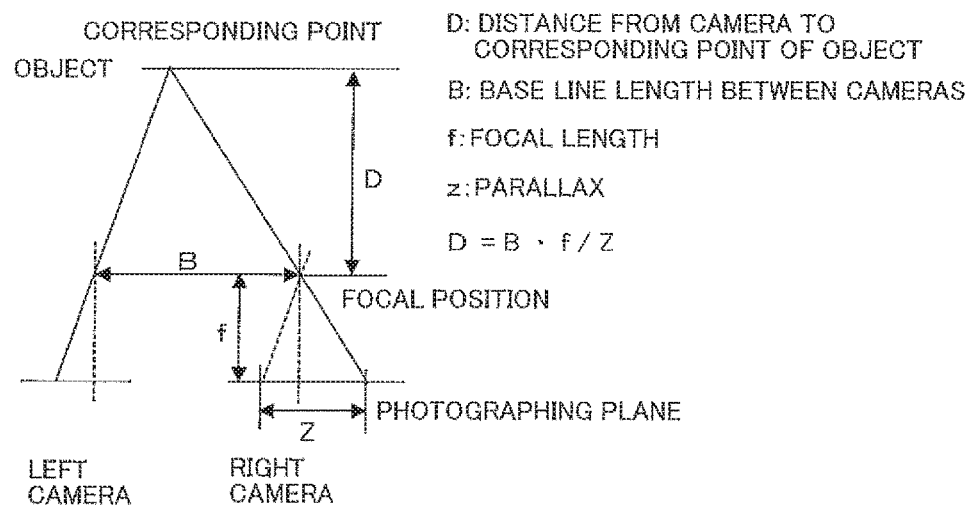
FIG. 6 is a view which explains a distance calculation process by a stereo camera.

Next, the object identifying section 14*b* calculates the width, depth and height from the image of the identified object and stores the calculation result in the RAM 18 as the size data of the identified object (S103). FIG. 6 is a view which explains a distance calculation process by a stereo camera. In FIG. 6, the distance is determined by calculation using the base line length between the left and right cameras, focal length and parallax from the image taken by the stereo camera and based on this, the width, depth and height may be calculated from the image of the identified object. At this time, an identifier corresponding to the identified object may be attached to the size data.

Next, the model state prediction section 14*c* reads a wire frame model corresponding to the identified object from the model information dictionary 201 on the basis of the identified object's identification data stored in the RAM 18 and generates a wire frame appropriate to the size indicated by the size data on the basis of the size data (S104). In this embodiment, it is assumed that the type of the first object is a passenger vehicle and for passenger vehicles, a rectangular parallelepiped three-dimensional wire frame model is written in the model information dictionary 201.

FIG. 7 is a view which shows an example of a wire frame model for the identified object. A wire frame model (three-dimensional wire frame model) 70 is generated from the identification data and size data of the object (see FIG. 7(*a*)). As shown in FIG. 7(*b*), the generated wire frame model 72 includes a corner and an edge which are in a blind spot as seen from the vehicle in which the camera 24 is mounted. Consequently, even the shape displacement of the first object (passenger vehicle) in a blind spot in the first object image can be predicted with higher accuracy. An identifier corresponding to the wire frame model may be attached.

The model state prediction section 14*c* merges the first object with the model. Specifically, the feature points of the first object are associated with the model (S105).

Figure 8:
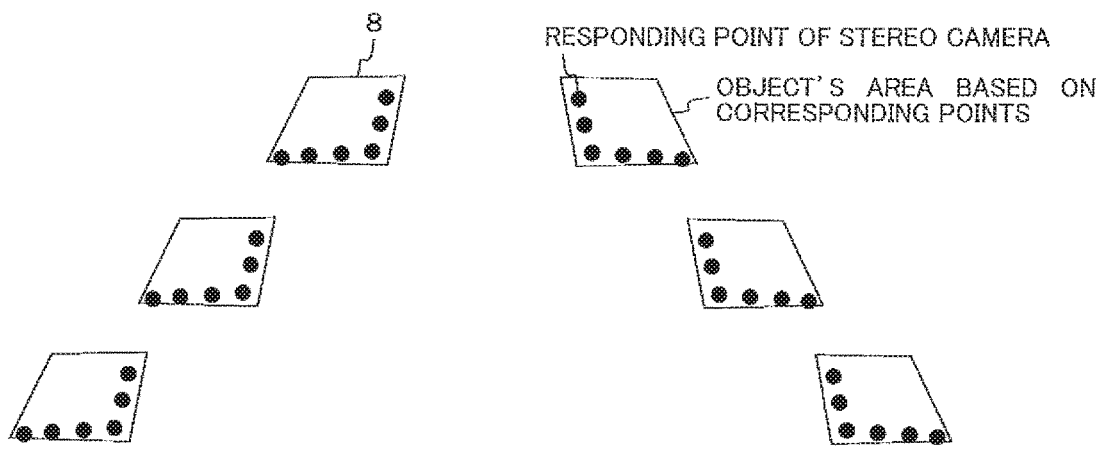
FIG. 8 is a view which shows the area of an object which is set on the basis of corresponding points of the stereo camera.

FIGS. 8 and 9 illustrate an example of extraction of feature points of an object. FIG. 8 shows the area of an object which is set on the basis of corresponding points of the stereo camera. As shown in FIG. 8, even if an object moves little or even if an object is not a rigid body and motion between feature points is complicated, distance can be calculated by detection of feature quantity by the stereo camera. Consequently, the corresponding points of the stereo camera can be recognized and an imaging area (object image) can be extracted on the basis of the corresponding points.

FIG. 9 shows an example of extraction of feature points from the object image. For feature point detection, corners and the like are detected using Harris Operator or the like to detect feature points of an object 90 such as corners (see FIG. 9(*a*)). An identifier is attached to each feature point. A detected feature point is associated with relative coordinates from a corner of the wire frame model (see FIG. 9(*b*)). Consequently, the position of the feature point can be defined as a position in the wire frame model 92.

Although not shown in FIG. 5, in the period from S101 to S105, a second image taken by the camera 24 at a second clock time later than the first clock time is read and a second object image is extracted and identified from the second image through the same step as S102.

The model state prediction section 14*c* calculates a motion vector and acceleration from motion observation of the identified object on the basis of the first object image and the second object image (S106). When this step is first taken, the velocity of the object is calculated by observing the object at a given time after the time when the object is first identified, and the acceleration of the object is calculated by observing the object a further given time later. FIG. 10 is a view which shows an example of calculation of motion vectors and accelerations. In FIG. 10, the motion vectors and accelerations of feature points of the model 100 are detected. At first, a motion vector and acceleration may be detected, for example, by semi-global matching, etc. Various motion vector calculation methods are available and for example, the KLT feature point calculation method may be used.

The model state prediction section 14*c* observes the identified first object and the surrounding state of the identified first object and searches a finite state sequence corresponding to the identified first object and its surrounding state from the state sequence dictionary 202 previously stored in the file unit 20 (S107).

Figure 11:
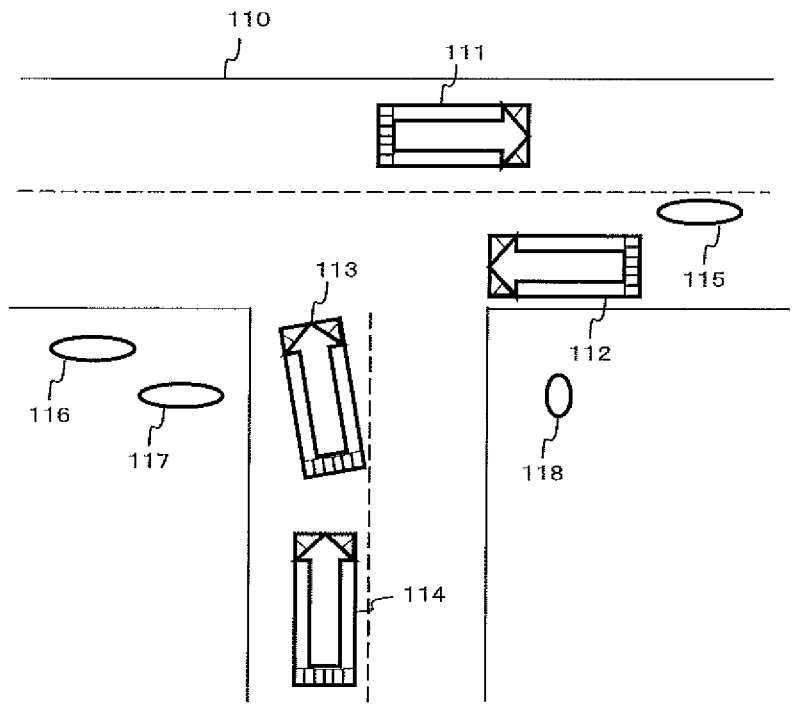
FIG. 11 is a view which shows objects identified in the observation space as a state on a two-dimensional road map.

FIG. 11 is a view which shows objects identified in the observation space 41 (see FIG. 4) as a state on a two-dimensional road map, by acquiring road map data from a car navigation system, etc. which operates in conjunction with the GPS, etc. FIG. 12 shows an example of a finite state sequence, in which (a) shows an example of a finite state sequence indicating a single motion angle widely and (b) conceptually shows selection of a motion sequence based on the state of the object.

Figure 12A:
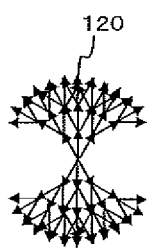

The model state prediction section 14c selects a finite state sequence 120 from the state sequence dictionary 202 stored in the file unit 20 (see FIG. 12(a)).

Figure 12B:
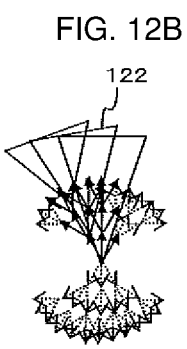

Next, the model state prediction section 14c selects a plurality of motion sequences from the selected finite state sequence 120 according to at least one of the position of the first object and the initial observed state (S108). The motion sequence with a state prediction 122 illustrated in FIG. 12(b) is the selected motion sequence.

Figure 13:
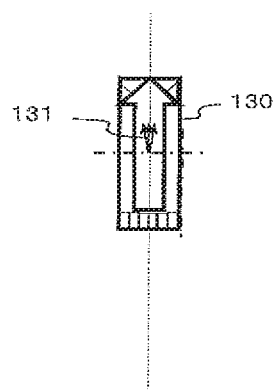
FIG. 13 is a view which shows a state in which a selected motion sequence 131 is assigned to a first object 130.
Figure 14:
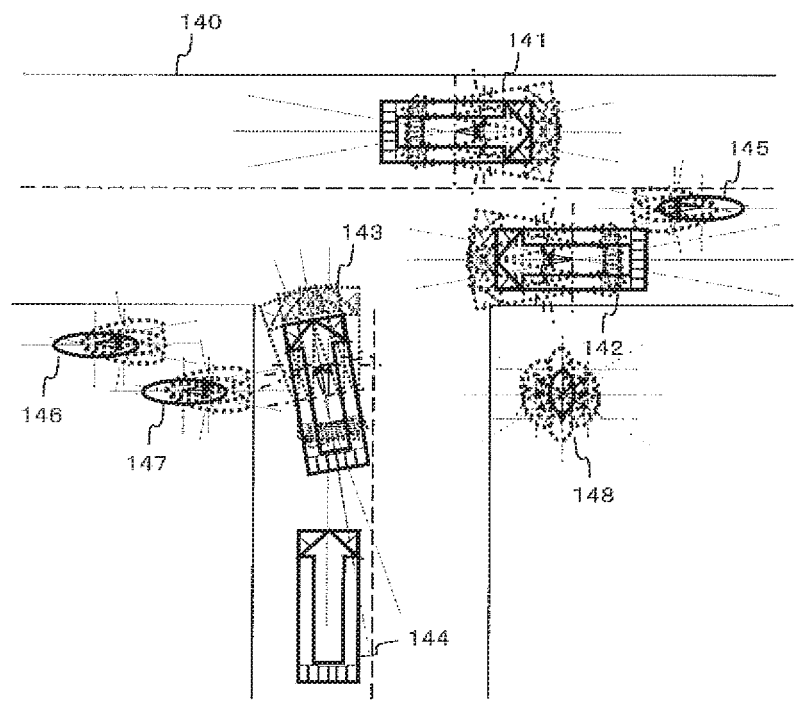
FIG. 14 is a view which shows a state in which motion sequences are applied to objects on the two-dimensional road map shown in FIG. 11.

The model state prediction section 14c assigns a plurality of selected sequences to objects (S109). FIG. 13 shows a state in which a selected motion sequence 131 is assigned to a first object 130. When this process is applied to objects 111, 112, 113, 114, 115, 116, 117, and 118 in FIG. 11, motion prediction is made on the two-dimensional road map as indicated by objects 141, 142, 143, 144, 145, 146, 147, and 148 in FIG. 14.

Figure 15:
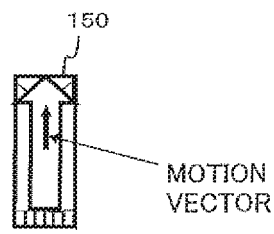
FIG. 15 is a view which shows a motion vector of an object.
Figure 16:
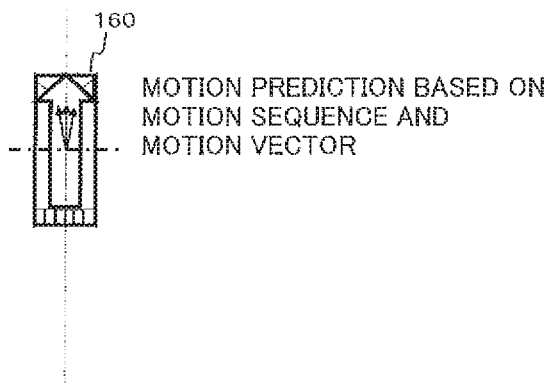
FIG. 16 is a view which shows motion prediction based on a motion sequence and a motion vector.
Figure 17:
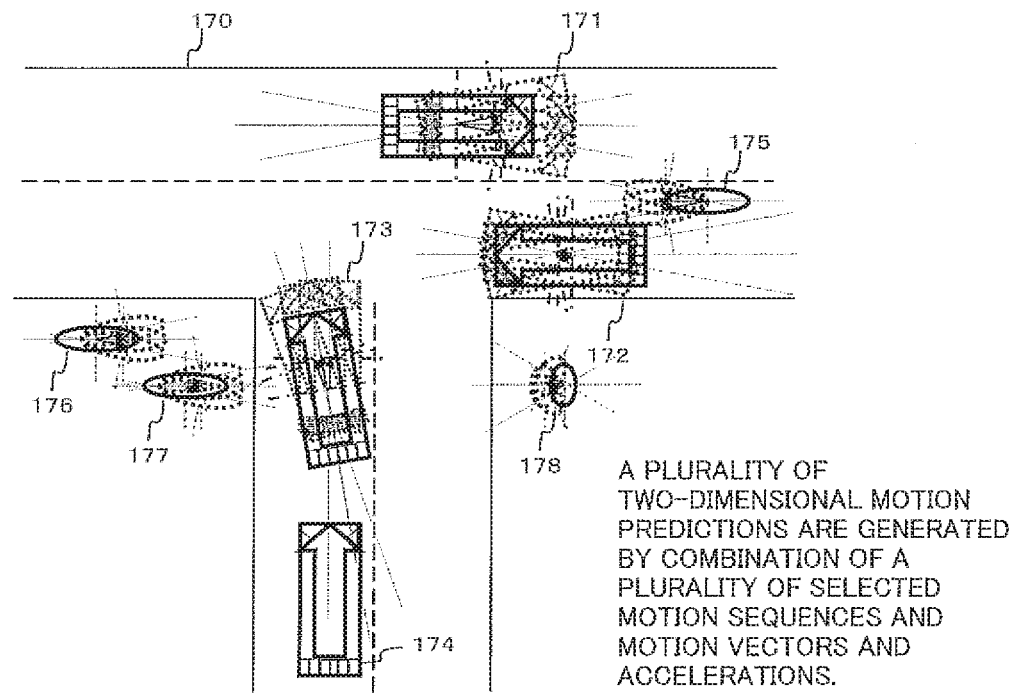
FIG. 17 is a view which shows a state in which a plurality of two-dimensional motion predictions are generated by combination of a plurality of selected motion sequences and motion vectors and accelerations.

The model state prediction section 14c superimposes the motion vectors and accelerations observed at S106 on the objects whose motions have been predicted (objects 141, 142, 143, 144, 145, 146, 147, and 148 in FIG. 14) (S110). FIG. 16 shows a state in which a motion vector 150 (see FIG. 15) is superimposed on the first object 130 to which the selected motion sequence 131 has been assigned (see FIG. 13). Motion prediction 160 (see FIG. 16) is different in amplitude from the motion sequence 131 before superimposition (FIG. 13) due to the superimposed motion vector 150. When this process is applied to each object in FIG. 14, the motion prediction on the two-dimensional road map in FIG. 14 turns into motion prediction on the two-dimensional road map as shown in FIG. 17.

The model state prediction section 14c transforms the motion prediction on the two-dimensional road map into an observation space as seen from the camera 24 (S111). An example of this transformation is expressed by Formula (1) below.

[Formula 1]

Calculation formula of projection transformation of an object in a two-dimensional space $$\begin{bmatrix} x_i' \\ y_i' \\ 1 \end{bmatrix} = \begin{bmatrix} h_{11} & h_{12} & h_{13} \\ h_{21} & h_{22} & h_{23} \\ h_{31} & h_{32} & h_{33} \end{bmatrix} \begin{bmatrix} x_i \\ y_i \\ 1 \end{bmatrix} \quad (1)$$

$$x_i' = \frac{(h_{11} \cdot x + h_{12} \cdot y + h_{13})}{(h_{31} \cdot x + h_{32} \cdot y + h_{33})}$$

$$y_i' = \frac{(h_{21} \cdot x + h_{22} \cdot y + h_{23})}{(h_{31} \cdot x + h_{32} \cdot y + h_{33})}$$

FIG. 18 shows the transformation of the wire frame model as calculated by Formula (1). The two-dimensional coordinates $(x_i, y_i)$ of a wire frame model 180 set in the observation space 41 obtained from the camera 24 are transformed into two-dimensional coordinates $(x_i', y_i')$ after motion prediction, deforming it into a wire frame 182. Although FIG. 18 shows only one wire frame model for illustrative convenience, actually a plurality of deformed wire frame models are generated according to a plurality of two-dimensional motion sequences (motion predictions).

As a result of the wire frame model transformation (projection transformation in the above case) in FIG. 18, the feature points 190 associated with the wire frame model are also projection-transformed into feature points 192 (see FIG. 19). Although FIG. 19 shows only one wire frame model for illustrative convenience, actually a plurality of deformed wire frame models are generated according to a plurality of two-dimensional motion sequences (motion predictions) and accordingly a plurality of feature point sets are generated.

The model state prediction section 14c generates particles 200 in a small area of the coordinates of a transformed feature point 192 according to probability (see FIG. 20) (S112). In generating particles, horizontal and vertical displacement and angular displacement are shifted in the same group so that particles cover each other to enhance spatial comprehensiveness with a small number of particles.

The matching section 14d performs matching between the second object image and the generated particles, starting with particles with the highest probability (S113). Here, particles with the highest degree of similarity are selected. Since the distribution of particles differs with each feature point, the wire frame and feature point positions are corrected by particles with the highest degree of similarity/consistency and similarity calculation is checked. Then, a sequence 210 with the highest particle similarity/consistency in the same sequence is selected (see FIG. 21). The matched particles are associated with the feature points corresponding to the transformed wire frame model.

The process goes back to step 108 and the subsequent steps are repeated while the first image is replaced by a second image and the second image is replaced by a third image taken at a clock time later than the second clock time.

According to this embodiment, since displacement of an object is estimated by transition of a model associated with each object and a small number of feature points associated with the model, even if a plurality of similar objects are present or an object is shielded, the position of each of the objects can be estimated without an increase in the amount of calculation.

The above embodiment is not for limiting the present invention and various modifications within the range not deviating from the spirit of the present invention are included in the present invention.

For example, in addition to the above configuration, a state output section may be further provided which outputs information indicating the state of the second object image when it is decided that the predicted state of the first object image matches the state of the second object image. For example, in addition to the above configuration, a state processing section may be provided to calculate, according to an image from the camera mounted in a vehicle, a predicted state indicating that a pedestrian or vehicle is moving in a direction of collision against the vehicle with the camera mounted in it, and to send information about the risk of collision to a HUD or alarm device mounted in the vehicle to alert the driver when the predicted state matches the second object image. Consequently, state prediction output can be done after checking the correctness of the predicted state on the basis of the result of matching with the second object image, so information (for example, warning) can be outputted on the basis of state prediction with higher accuracy.

Although the embodiment which uses images from an in-vehicle camera has been so far described, the present invention may be applied to images from a fixed-point observation camera in order to predict motion of an object whose image is taken by the fixed-point camera, for example, a suspicious individual.

Furthermore, the present invention may be applied to a case of observation of crop growth by a fixed-point camera in order to predict the crop growth. In this case, a finite state sequence which defines a sequence of shape change with crop growth is applied and a model of crop shape in the initial state is prepared. Then, the amount of change in crop shape may be calculated from an image at the time of state prediction and depending on the amount of change, the model is geometrically transformed on the basis of the finite state sequence to calculate a predicted state.

In that case, a finite state sequence which defines a sequence of color change with crop growth may be further provided and the finite state sequence which depends on the type of crop may be applied to the color of the crop in the initial state so that color change as well as shape change is predicted and a model prediction section outputs the changed color.

REFERENCE SIGNS LIST

10 . . . image processing apparatus,
12 . . . data output I/F,
14 . . . CPU,
16 . . . ROM,
18 . . . RAM,
20 . . . file unit,
24 . . . camera,
30 . . . real space,
40 . . . image

The invention claimed is:

1. An image processing apparatus comprising:
an image reading section which reads a first image taken at a first clock time and a second image taken at a second clock time later than the first clock time;
an object identifying section which extracts a first object image as an image of a first object of state prediction from the first image, identifies a type of the first object and extracts a second object image as an image of a second object of state prediction from the second image;
a model information storing section which stores model information for defining a model appropriate to the type of object of state prediction;
a finite state sequence storing section which stores finite state sequences defining a plurality of state change sequences with time which correspond to the type of the first object;
a model state prediction section which reads model information corresponding to the type of the first object from the model information storing section, associates a feature point of the first object image with the read model, searches a finite state sequence corresponding to the type of the first object from the finite state sequence storing section, selects a plurality of motion sequences from among motion sequences included in the searched finite state sequence according to at least one of a position of the first object and an initial observed condition of the first object, transforms a model merged with the first object image and coordinates of a feature point associated therewith according to each motion sequence included in the plural selected motion sequences, and generates particles around the transformed feature point depending on existence probability; and
a matching section which performs matching between the second object image included in the second image taken at the second clock time later than the first clock time and the particles generated on the basis of the feature points and determines particles with highest probability among the particles generated for the feature points, as a predicted state of the first object at the second clock time; and
a data output I/F which outputs the predicted state of the first object at the second clock time to an external device to warn of a potential collision with a pedestrian or vehicle or to indicate crop growth information to a user.

2. The image processing apparatus according to claim 1, wherein
the finite state sequence storing section stores a finite state sequence defining a sequence of shape change of the object, and
the model state prediction section calculates an amount of shape change of the object and calculates a predicted state by geometrically transforming the model depending on the amount of shape change.

3. The image processing apparatus according to claim 1, wherein
the finite state sequence storing section stores a finite state sequence defining a sequence of color change of the object, and
the model state prediction section outputs a changed color of the object.

4. The image processing apparatus according to claim 1, wherein
the finite state sequence storing section stores a finite state sequence defining a sequence of feature quantity change of the object, and
the model state prediction section outputs a changed feature quantity sequence of the object.

5. The image processing apparatus according to claim 1, wherein
the model included in the model information is a three-dimensional wire frame model including a corner or edge which is in a blind spot in the first object image.

6. The image processing apparatus according to claim 1, wherein
the matching section further comprises a state output section which outputs a state of the second object when a degree of similarity between the first object image and the second object image is within an allowable threshold to decide that a predicted state of the first object and the second object are identical.

7. The image processing apparatus according to claim 1, wherein
the object is a vehicle, and
the first image and the second image are images taken forward in a traveling direction of the vehicle from a camera mounted in the vehicle.

8. The image processing apparatus according to claim 1, wherein
the first image and the second image are images taken by a fixed-point observation camera, and
the object is an object of fixed-point observation.

9. The image processing apparatus according to claim 1, wherein
the first image and the second image are images taken by a fixed-point observation camera,
the first object image and the second object image are images in which a same crop is imaged by the fixed-point observation camera,
the finite state sequence is a sequence which defines a sequence of shape change with growth of the crop, and
the model is a model of crop shape in an initial state.

10. The image processing apparatus according to claim 9, wherein
a second finite state sequence defines a sequence of color change with the growth of the crop.

11. The image processing apparatus according to claim 1, wherein
the first image and the second image are obtained from an in-vehicle camera, and the data output I/F outputs a collision warning to the external device based on the predicted state of the first object at the second clock time.

12. The image processing apparatus according to claim 1, wherein
the first image and the second image are obtained from a fixed-point camera, and the data output I/F outputs a motion prediction of the first object to the external device based on the predicted state of the first object at the second clock time.

13. An image processing method comprising the steps of:
extracting a first object image as an image of a first object of state prediction from a first image taken at a first clock time and identifying a type of the first object;
merging a model appropriate to the type of the object of state prediction with the first object image and associating a feature point of the first object image with the model;
searching a finite state sequence defining a plurality of state change sequences with time which corresponds to the type of the first object, from a finite state sequence storing section which stores a plurality of finite state sequences;
selecting a plurality of motion sequences from among motion sequences included in the searched finite state sequence according to at least one of a position of the first object and an initial observed condition of the first object;
transforming a model merged in the first object image and coordinates of a feature point associated therewith according to each motion sequence included in the plural selected motion sequences;
generating particles around the transformed feature point depending on existence probability; and
performing matching between a second object image included in a second image taken at a second clock time later than the first clock time and the particles generated on the basis of the feature points and determining particles with highest probability among the particles generated for the feature points, as a predicted state of the first object at the second clock time; and
outputting the predicted state of the first object at the second clock time to an external device to warn of a potential collision with a pedestrian or vehicle or to indicate crop growth information to a user.

* * * * *